United States Patent
Thompson

(10) Patent No.: US 6,434,487 B1
(45) Date of Patent: Aug. 13, 2002

(54) METHOD FOR ESTIMATING PORE FLUID PRESSURE IN SUBTERRANEAN FORMATIONS

(76) Inventor: Karl V. Thompson, 2822 W. Pebble Beach, Missouri City, TX (US) 77459

( * ) Notice: Subject to any disclaimer, the term of this patent is extended or adjusted under 35 U.S.C. 154(b) by 0 days.

(21) Appl. No.: 09/552,539

(22) Filed: Apr. 19, 2000

(51) Int. Cl.⁷ .................................................. G01V 1/28
(52) U.S. Cl. ...................................................... 702/14
(58) Field of Search .............................. 702/14, 17, 18; 367/73

(56) References Cited

U.S. PATENT DOCUMENTS

| | | |
|---|---|---|
| 4,981,037 A | 1/1991 | Holbrook et al. |
| 5,081,612 A * | 1/1992 | Scott et al. ................. 367/38 |
| 5,128,866 A | 7/1992 | Weakley |
| 5,130,949 A | 7/1992 | Kan et al. |
| 5,136,552 A * | 8/1992 | Kelly et al. .................. 367/47 |
| 5,144,589 A | 9/1992 | Hardage |
| 5,200,929 A | 4/1993 | Bowers |
| 5,615,115 A | 3/1997 | Shilling |
| 5,859,367 A | 1/1999 | Holbrook |
| 5,937,362 A | 8/1999 | Lindsay et al. |
| 5,965,810 A | 10/1999 | Holbrook |
| 6,028,820 A * | 2/2000 | Pisetski ....................... 367/38 |

* cited by examiner

Primary Examiner—Donald E. McElheny, Jr.
(74) Attorney, Agent, or Firm—Keeling Law Firm

(57) ABSTRACT

A method for estimating pore fluid pressures in subterranean formations is disclosed for use in evaluating potential problems that might be encountered in drilling wells. It is a mathematical method based on the assumption that the second derivatives of an interval velocity vs. depth relationship, whether obtained by seismic means or from well sonic information, are equal to the second derivatives of the effective vertical stress relationships in the formations described by the interval velocity relationship. The assumption, and thus the method, is thought to be entirely general except in the presence of formations heavily saturated with natural gas.

36 Claims, 7 Drawing Sheets

METHOD FOR ESTIMATING PORE FLUID PRESSURE IN SUBTERRANEAN FORMATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

The present invention is a method for estimating fluid pressures in a series of subterranean formations from formation interval velocity data. The invention measures directly, from the velocity data, the variations in the effective vertical stress, which are due to variations in the fluid pressures in the subterranean formations. The invention uses these variations to estimate the effective vertical stresses that, together with an estimate of the corresponding overburden stresses, allow estimation of the corresponding fluid pressures in the formations.

2. Related Art

Typically, while drilling an oil or gas well, the density of the drilling mud must be controlled so that its hydrostatic pressure is not less than the fluid pressure present in the pores in any formation along the uncased borehole (where the borehole is open to the formations). Otherwise, formation fluid may flow into the borehole. This can lead to a blowout if the flow is not stopped before the formation fluid reaches the top of the well. If the fluid contains hydrocarbons, this can result in fire or explosion.

Blowouts result where the mud weight is too low to balance fluid pressures within the subterranean formations. Excessive overbalance, where the hydrostatic pressure of the drilling mud greatly exceeds the fluid pressures in the subterranean formations, can induce undesirable fractures in the borehole wall that causes loss of drilling fluid. The drill pipe may also get stuck along contact zones with the borehole wall if the hydrostatic pressure of the mud is too much in excess of the fluid pressure in the subterranean formations. Also overbalanced mud typically reduces the penetration rate of the drill bit resulting in increases in drilling time which result in increased drilling costs. Therefore, to optimize drilling performance and minimize drilling problems, the mud weight must be adjusted according to the variation of the fluid pressures in the formations along the borehole. Prediction of these variations in the fluid pressure in the formations along the borehole is essential to safe and economical drilling.

The prior art contains numerous discussions of the problem and of the geologic factors involved that create anomalous fluid pressures within the subterranean formations. Anomalous fluid pressures can be attributed to several causes.

The basic physics of determining pore pressure is described by Terzaghi's principle. Terzaghi's principle states that the total downward force on an element of volume of rock is supported by two upward forces, the effective vertical stress (the part supported by the rock matrix) and by the fluid pressure of the fluid in the pore space of the rock in said element of volume. Terzaghi's principal is expressed in equation form as:

$$S = P + EVS$$

where S=the downward force due to the weight of the overburden rock column,

P=the formation fluid pressure in the pore spaces of the rock, and

EVS=the effective vertical stress exerted upward by the rock matrix itself

Anomalous formation pressure can be caused by "undercompaction", thermal expansion of the formation fluid trapped in the pore spaces of the formation (aquathennal pressuring), clay diagensis (expulsion/expansion of integranular water due to temperature changes) and various other causes. Undercompaction occurs when low permeability inhibits fluid in the pores of the formation from escaping as rapidly as the pore space would like to compact due to the force exerted by the weight of the column of rock above the formation.

The prior art contains numerous methods of computing the effective vertical stresses in the formations penetrated by the borehole, and subsequently computing the fluid pressure in those formations by subtracting the effective vertical stress, EVS, from the overburden stress, S. The prior art also contains numerous methods of computing pore pressure directly without having to compute effective vertical stress.

Most of the prior art techniques rely on either empirically derived baselines or empirically derived virgin curves in the form of interval velocity vs. depth. At least one prior art method expresses effective vertical stress in terms of temperature, age, rate of deposition, and other geologic parameters.

The technique described herein differs from previous methods and is useful because it can be employed, without detailed knowledge of the geological parameters at depth, to produce relative estimates of effective vertical stresses, and thus pore pressures, on an areal extent to the accuracy permitted by the input velocity functions. It is based upon the established fact that as the pore pressure changes in a given formation, the effective vertical stress changes, and thus the interval velocity changes in the formation. The pore pressure changes are thus reflected in the second derivatives of the velocity function changing as the second derivatives of the effective stress function changes at a given location.

The interval velocity information of the subterranean formations is usually obtained, at a specific location, from the sonic log obtained by passing a tool down the borehole and recording the interval transit times of sound passing through a given formation between a source and receiver within the tool. The interval velocities can then be directly calculated from the interval transit times. Also, the interval velocities of the subterranean formations can be obtained, both at the location to be drilled and over an areal map extent on a spatially varying basis by calculations on seismically recorded data.

This invention is unique in that it requires no baselines, virgin curves, nor detailed knowledge of geologic parameters at depth to compute, from the interval velocity vs. depth (or interval velocity vs. time) function, the effective vertical stress function. The only parameters needed are the water depth (for marine cases) and the initial conditions for at least the first depth interval of the effective vertical stress vs. depth to be computed plus the second derivatives of the interval velocity vs. depth friction. The first initial condition is that the effective vertical stress is zero at the mudline (for marine cases) or is zero at the surface for land cases. This is known to be true by definition. The second initial condition is to assume a rate of increase of effective vertical stress (a first derivative value) across the first depth (or time interval). For the depth case this first derivative is typically, but not limited to, the range of 0.465 psi/ft to 0.535 psi/ft. If the first interval is hydrostatically pressured (is in hydraulic communication with the surface) then theoretically this first derivative should be very close to 0.535 psi/ft (or the equivalent in time for the time case).

Generally sonic logs do not have sufficient information on the shallow data to compute the initial conditions directly from the data, the logs usually being started, especially in deep water, several thousand feet below the mud line. However, the newer generation of seismic 3D information usually provides rather good interval velocity information on the shallow zone below the mudline, and, when this is so, it is feasible to compute the initial conditions directly from the velocity data.

Since the second derivatives of the interval velocity function should be the same as the second derivatives of the desired effective vertical stress function, mathematics implies that an alternate solution using the first derivatives should be equally valid. This solution, in practicality, requires an accurate computation of the difference between the initial first derivative of the interval velocity function and the assumed first derivative of the effective vertical stress function as well as a knowledge, for marine cases, of the exact sediment velocity of the rock at the mudline.

The complete effective vertical stress vs. depth (or time) function can then be computed by numerical integration using these initial conditions and using the said second derivatives starting at the end of the initial interval. This is made possible by recognizing that the second derivatives of an effective vertical stress function will be the same, except for an initial interval, as those of the interval velocity function. This is the basis for this invention and this premise has been tested and found to be true. The resulting effective vertical stress functions' accuracies primary limitations are the accuracies of the velocity function and the choice of an original condition.

Because this invention is an effective vertical stress technique, Terzaghi's principle holds and the computed effective vertical stress at each depth must be subtracted from the total vertical stress value corresponding to that depth to obtain the fluid pressure of the subterranean formation at that depth at the location where the interval velocity function applies. Accurate estimation of the total vertical stress (overburden stress) is necessary for final estimation of fluid pressures in the formations. The estimation of the total vertical stress relies on good empirical information about the densities of the area of interest and the relationship between these densities and seismic interval velocities.

BRIEF SUMMARY OF THE INVENTION

Accordingly, the objectives of this invention are to provide, inter alia, a new and improved method of estimating downhole fluid pressures that:

effectively estimates and predicts pore pressure changes;

utilizes existing geological data; and requires no geophysical baselines, virgin curves or detailed geologic parameters at depth.

These objectives are addressed by the structure and use of the inventive process.

The inventive method achieves improved accuracy in estimating pore fluid pressures in subterranean formations. It is based on the fact that the primary cause of changes in the interval velocities of rocks are thought to be due to changes in the effective vertical stresses, and the effective vertical stresses vary under the influence of:

(1) the effects of compaction;

(2) the effects of changes in rock type; and (3) the effects of changes of fluid pressures within the pore spaces of the rock.

All of these effects contribute to changes in the effective vertical stress within a given rock volume and thus must be embodied in a function of interval velocity vs. depth (or time). Therefore the second derivatives of this interval velocity function must be reflected in the second derivatives of the effective vertical stress function vs. depth (or time).

An exception to this is thought to be the case of a formation heavily saturated with natural gas. It is well known that formations of this type exhibit abnormally low interval velocities without significant decrease in density. Examples have been observed where such rocks would cause the effective vertical stress to be underestimated by this technique and thus the pore pressures would be overestimated.

The initial conditions, for rocks normally pressured just below the surface (or mudline) are well known within narrow bounds and discussed well in the literature.

Any changes in the characteristics of the volume of rock under consideration do not influence the overburden stress due to the above column of rock, and given good density measurements, the fluid pressure in the pore space of the volume under consideration can be computed accurately by Terzaghi's principle, $S=P+EVS$ which holds true at the interface at the top of the volume.

This invention is thus an improvement to the problem of computing accurate effective vertical stress functions, previously based on empirical baselines and often insufficient data, and provides a method having improved accuracy and efficiency.

Other objects of the invention will become apparent from time to time throughout the specification hereinafter disclosed.

DETAILED DESCRIPTION OF THE INVENTION

Figure 1A:
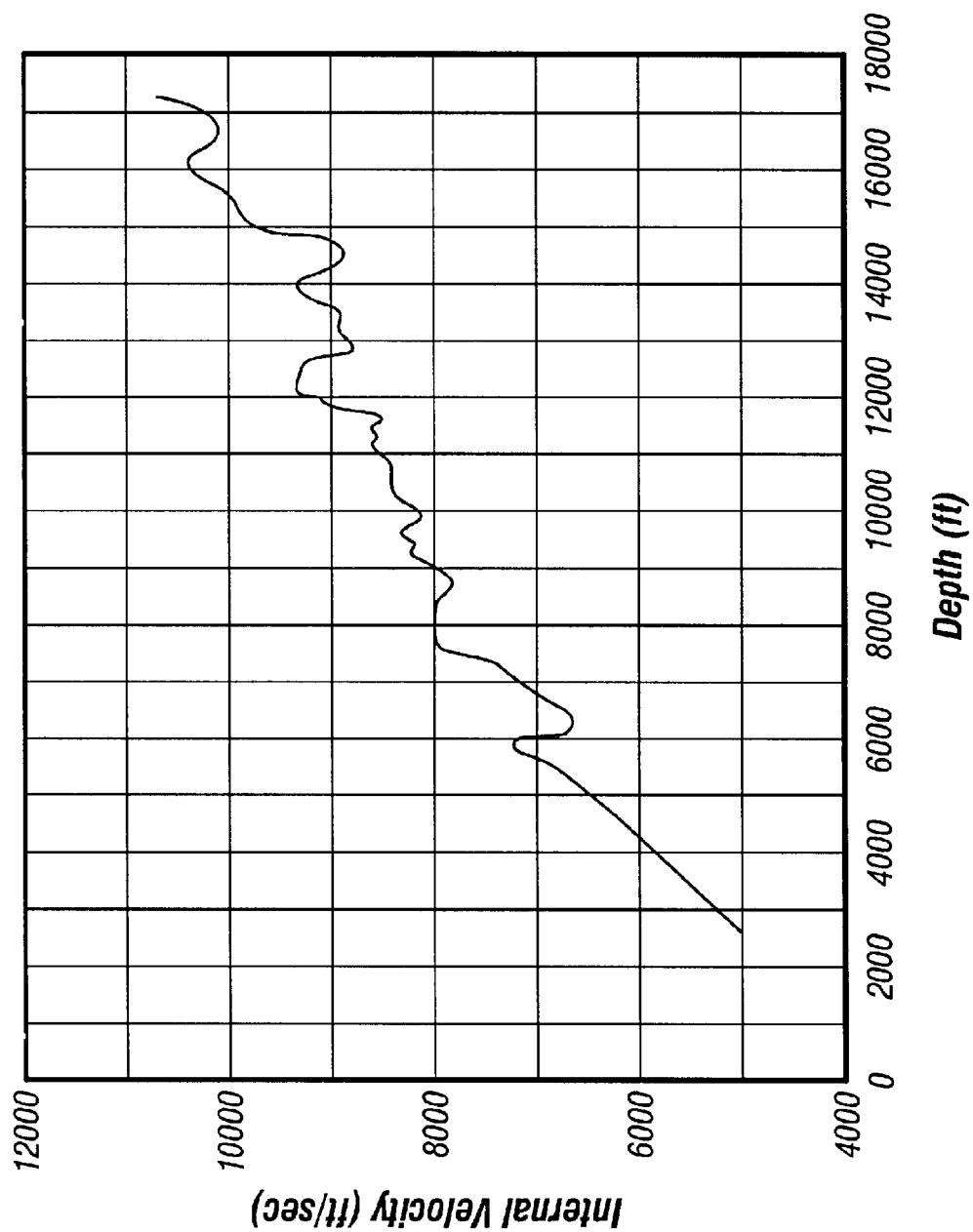
FIG. 1A depicts a velocity function derived from a sonic log in approximately 2500 feet of water in the Garden Banks area of the Gulf of Mexico.

The present invention is a method for utilizing seismic velocity data or sonic log data to estimate, preferably by computer software, effective vertical stress and thus calculate, preferably by computer software, the fluid pressure in the pore spaces of subterranean formations at specified locations to aid in safe and efficient drilling of wells for the purpose of recovering hydrocarbons. It is primarily intended for, but not limited to, the conversion of 3D seismic velocity volumes to 3D volumes of effective vertical stress and to 3D volumes of fluid pore pressures over a wide areal extent. These 3D volumes can then be used to provide effective vertical stress or fluid pore pressure overlay information to be displayed, preferably by computer, simultaneously with seismic reflection data, either on a 3D or 2D basis. The method can also be used, either alone or in a confirming mode along with other methods, to provide at a particular drilling site real time prediction of fluid pore pressures below the level of the drilling bit as updated sonic information above the drill bit becomes available during the drilling and logging process.

All computations for effective vertical stress are understood to begin at a datum associated with the top of the rock column (termed the mudline in marine cases and the land topographic surface in land applications.) Computations of the overburden stress, however, begin at sea level in the marine case (the weight of the water must be taken into account). Depths are usually expressed, in the marine case, from sea level in feet or meters and appropriate (English or metric) conversion factors are employed depending on the units. Interval velocities can be expressed in either feet/second or meters/second and similarly appropriate conversion factors may be used. The interval velocity of rock is defined as the ratio of the distance to the interval transit time (of a sound wave) over that distance, in the vertical direction, VI=distance/time, or in our discussion, VI=dz/dt. If time is in seconds and depth is in feet then VI is in units of feet/second. Other units may be used.

The term location (or specified geodetic location) refers to a single set of map coordinates expressed in x (easting) and y (northing) from any map projection that specifies a point in latitude and longitude on a spheroid (there are many) representing the earth. The term datum always refers to the top of the rock column. In the marine case this is different from the seismic datum which is usually at sea level. The top of the rock column would, in this case be at the water bottom (mudline).

PROCESS

Defining two functions of depth as $f(z)$ and $g(z)$, where:

$$f''(z)=g(z) \qquad \text{Equation 1.}$$

(the " denotes a second derivative of the function)
then, $$f'(z)=g(z)+c_1 \qquad \text{Equation 2.}$$

(the ' denotes a first derivative and $c_1$ is a first constant) then.

$$f(z)=g(z)+[c_1][z]+c_2 \qquad \text{Equation 3.}$$

($c_2$ is a second constant)
where $$c_1=f'(0)-g'(0) \qquad \text{Equation 4.}$$

(f' and g' evaluated at the zero, first point of $f(z)$ and $g'(z)$) and $$c_2=f(0)-g(0) \qquad \text{Equation 5.}$$

(f and g evaluated at the zero, first point of f (z) and g (Z)) then f (z) can be evaluated from g (z), g'(z) and the constants.

Figure 4:
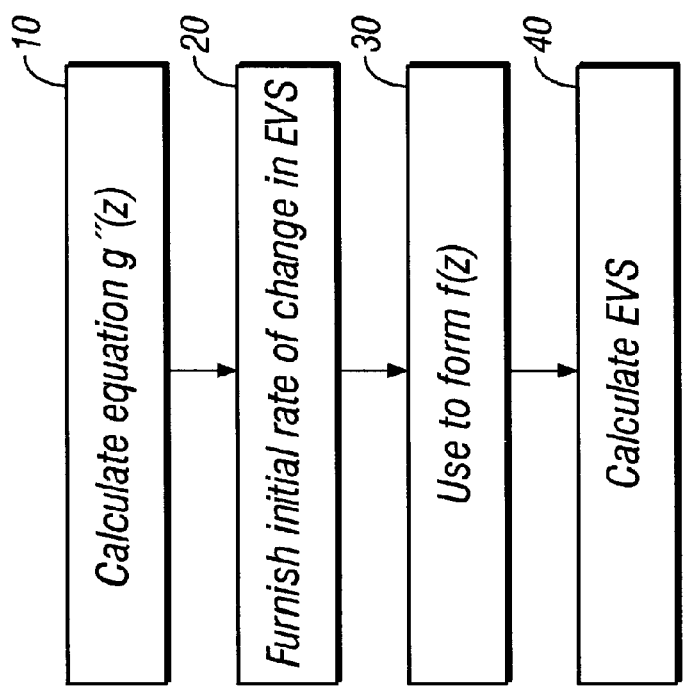
FIG. 4 is a schematic diagram of the method using a second derivative function.

Referring to FIG. 4, calculating (10) the second derivative by letting f (z) be a desired function of effective vertical stress (evs) and g(z) be the input interval velocity function, the appropriate substitutions from equations (1) through (5) arc made into the trajectory equation (6) to transform it into a formula for computing effective vertical stress at any depth z as a function of the initial conditions and the second derivatives of the interval velocity function versus depth (or time). This allows die estimation of effective vertical stress in subterranean formations at specified geodetic locations by a) taking the effective vertical stress to be zero at the mudline (or at the surface for land data);

b) furnishing (20) an initial condition by assuming that f'(0) is closely approximated by using an initial effective stress gradient near 0.535 over an initial first interval from the initial datum (mudline or surface) to a predetermined depth (typically between 1,000' and 2,000');

c) using (30) the second derivatives of the interval velocity function, g(z); and d) calculating (40) by numerical integration a complete effective vertical stress versus depth (or time) function beyond the predetermined depth at each of the specified geodetic locations. The data for the interval velocities is acquired from sonic means from a downhole measurement of the same hole, or from seismic means.

For the purpose of expressing the effective vertical stress as an integral, it is assumed that the interval velocity function has been resampled to equally spaced intervals. Therefore, it can be written in integral form assuming that the spacing has been resampled to a continuous function, dz=1. Thus, for an initial interval of k samples and a function of n samples in length, the formula for effective vertical stress can be written as:

$$evs(z) = f'(0) \int_{i=1}^{i=k} dz + \int_{i=k+1}^{i=n} \{f'(z_{i-1}) + g''(z_i)[z_i - z_{i-1}]\} dz \qquad \text{Equation 7.}$$

when $f(0)=evs(0)=0$. The initial condition, $f'(0)=evs'(0)$, is estimated either from empirical data or by theory. This is the initial rate of change for $evs(0)$, and is typically close to 0.535 psi/ft if the shallow section is normally pressured. The value will be lower if the shallow initial interval is partially overpressured. The f'(0) for the first k intervals, can also be estimated directly from the interval velocity function if one considers the shallow section to be normally pressured by calculating the overburden stress gradient and subtracting from it the hydrostatic fluid gradient, however shallow velocity estimates are generally unstable.

Equation (7) can be expressed in the form of a numerical integration, where there is no requirement for equally spaced intervals, as:

$$evs(z) = f'(0)\sum_{i=1}^{i=k}[z_i - z_{i-1}] + \sum_{i=k+1}^{i=n}\left\{[f'(z_{i-1})][z_i - z_{i-1}] + \frac{1}{2}g''(z_i)[z_i - z_{i-1}]^2\right\}$$

The second method, using the first derivatives is equally valid. The solution may likewise be expressed as a simple physics trajectory expression of the form:

$$x=\int [x_0+x'] \, dt, \qquad \text{Equation 8.}$$

which can be expressed as a numerical integration of the form:

$$x=x_0+\Sigma x' dt$$

Substituting variables as before, we have, using an initial interval consisting of k samples:

$$evs(z) = \{[f(0) - g(0)] + f'(0)\} \int_{i=1}^{i=k} dz + \int_{i=k+1}^{i=n} \{[f'(z_{i-1}) - g'(z_{i-1})] + g'(z_i)\} dz \qquad \text{Equation 9.}$$

which can be expressed as a numerical integration of the form:

$$evs(z) = \{[f(0) - g(0)] + f'(0)\} \sum_{i=1}^{i=k} [z_i - z_{i-1}] + \sum_{i=k+1}^{i=n} \{[f'(z_{i-1}) - g'(z_{i-1})][z_i - z_{i-1}] + g'(z_i)[z_i - z_{i-1}]\}$$

If the interval velocity function g(z) is first normalized such that g(0) is equal to zero, the first term becomes zero and the resulting relationship is simplified to:

$$evs(z) = f'(0) \int_{i=1}^{i=k} dz + \int_{i=k+1}^{i=n} \{[f'(z_{i-1}) - g'(z_{i-1})] + g'(z_i)\} dz, \qquad \text{Equation 10.}$$

which can be expressed as a numerical integration of the form:

$$evs(z) = f'(0) \sum_{i=1}^{i=k} [z_i - z_{i-1}] + \sum_{i=k+1}^{i=n} \{[f'(z_{i-1}) - g'(z_{i-1})][z_i - z_{i-1}] + g'(z_i)[z_i - z_{i-1}]\}$$

and either equation (9) or equation (10) can be solved by numerical integration, preferably on a computer.

Figure 5:
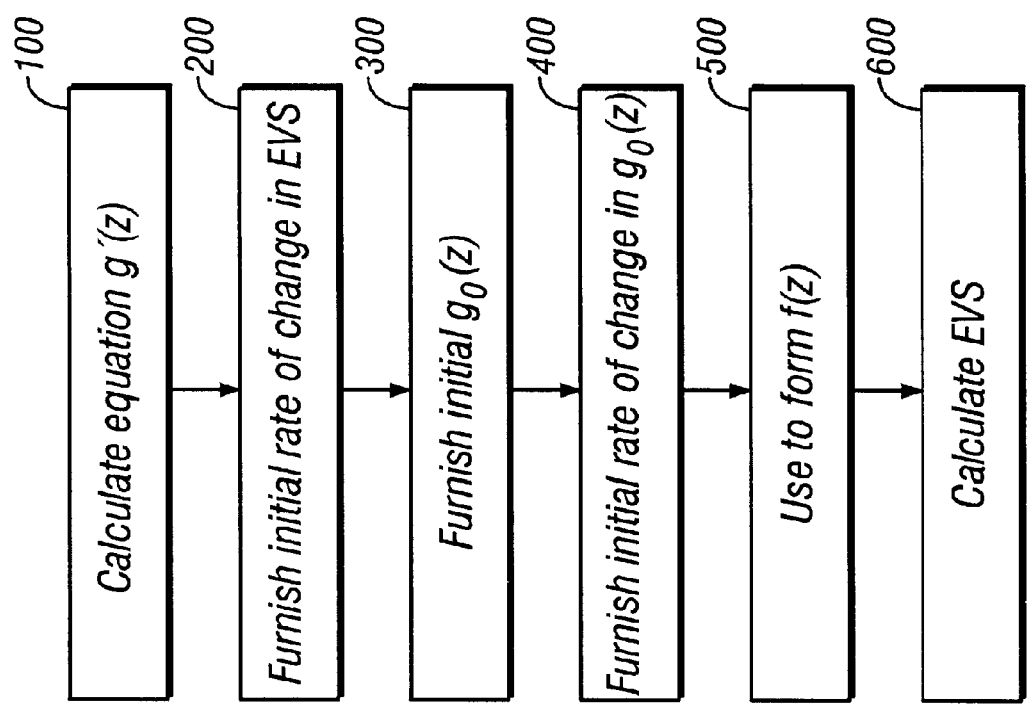
FIG. 5 is a schematic diagram of the method using a first derivative function.

Referring to FIG. 5, the first derivative method comprises the steps of:

calculating (100) the first derivatives of the interval velocity versus depth (or time) function in the subterranean formation at each specified geodetic location, 2) furnishing (200) a first initial condition comprising an initial rate of change in effective vertical stress versus depth (or time) from an initial datum (mudline or surface) to a predetermined depth (typically 1,000' to 2,000');

3) furnishing (300) a second initial condition comprising the interval velocity of the rock at the initial datum;

furnishing (400) a third initial condition comprising an initial rate of change in the interval velocity versus depth (or time) from the initial datum to the predetermined depth; and using (500) the first derivatives of the interval velocity versus depth (or time) function and the initial conditions to calculate (600) by numerical integration a complete effective vertical stress versus depth function in the hole beyond the predetermined depth. relationship between interval velocity and density. The overburden stress versus depth (or time) function can be estimated by integrating the density data from seismic means at specified geodetic locations, from the downhole well density log, or from a downhole well density log from at least one well geologically similar to a location at which the overburden stress (and subsequently pore pressures) are to be estimated. There are numerous forms for this relationship. In the examples shown in FIGS. 1–3, $D = 0.235 V_I^{0.25}$, expressing D in gms/cc when VI is in ft/sec, was used.

In the case of the computation of effective vertical stresses from seismic data over an areal extent, the results may be tied to the actual measured pore pressures in a series of wells scattered over that extent merely by, at each well site, repetitively calculating from the seismic the pore pressure, varying the initial conditions, and comparing each set of results to the measured pressures. By finding at each well site the initial condition that produces the best fit to the measured data, and by then posting and contouring these values on a map of the areal area under consideration, a digital file of spatially varying initial conditions can be obtained that can be used to compute, at the specified geodetic locations, of the seismic points away from the wells, a set of effective vertical stresses and pore pressures that best fits the well information.

It should be noted that there is an equivalence between measured seismic time and depth at a specified geodetic location when one knows the interval velocities at that location. Time can be converted to depth or depth to time by Dix's simple relationships:

$$z_i = \left(\frac{1}{2}\right) \sum_{i=1}^{i=j} VI_i dt \text{ and } t_1 = 2 \sum_{i=1}^{i=j} [VI_i]^{-1} dz,$$

where t is measured seismic two way time and j is the index of the sample at the base of the column above the volume under consideration. There is no requirement for either dz or dt to represent equally spaced intervals. This makes it possible to compute effective vertical stress and pore pressures in either time or depth and display them overlain on seismic sections displayed in either time or depth. At any stage of the processes, information can be transformed from one domain to the other (e.g. time to depth or depth to time).

In both the first derivative and second derivative methods described above, the pore pressure can be calculated using Terzaghi's principal is expressed in equation form as:

S=P+EVS where S=the downward force due to the weight of the overburden rock column, P=the formation fluid pressure in the pore spaces of the rock, and EVS=the effective vertical stress exerted upward by the rock matrix itself.

Thus the pore pressure is obtained by subtracting the effective vertical stress (EVS) from the overburden stress (S) at each depth.

Three examples, taken from the literature, are shown in FIGS. 1 through 3A.

Figure 1B:
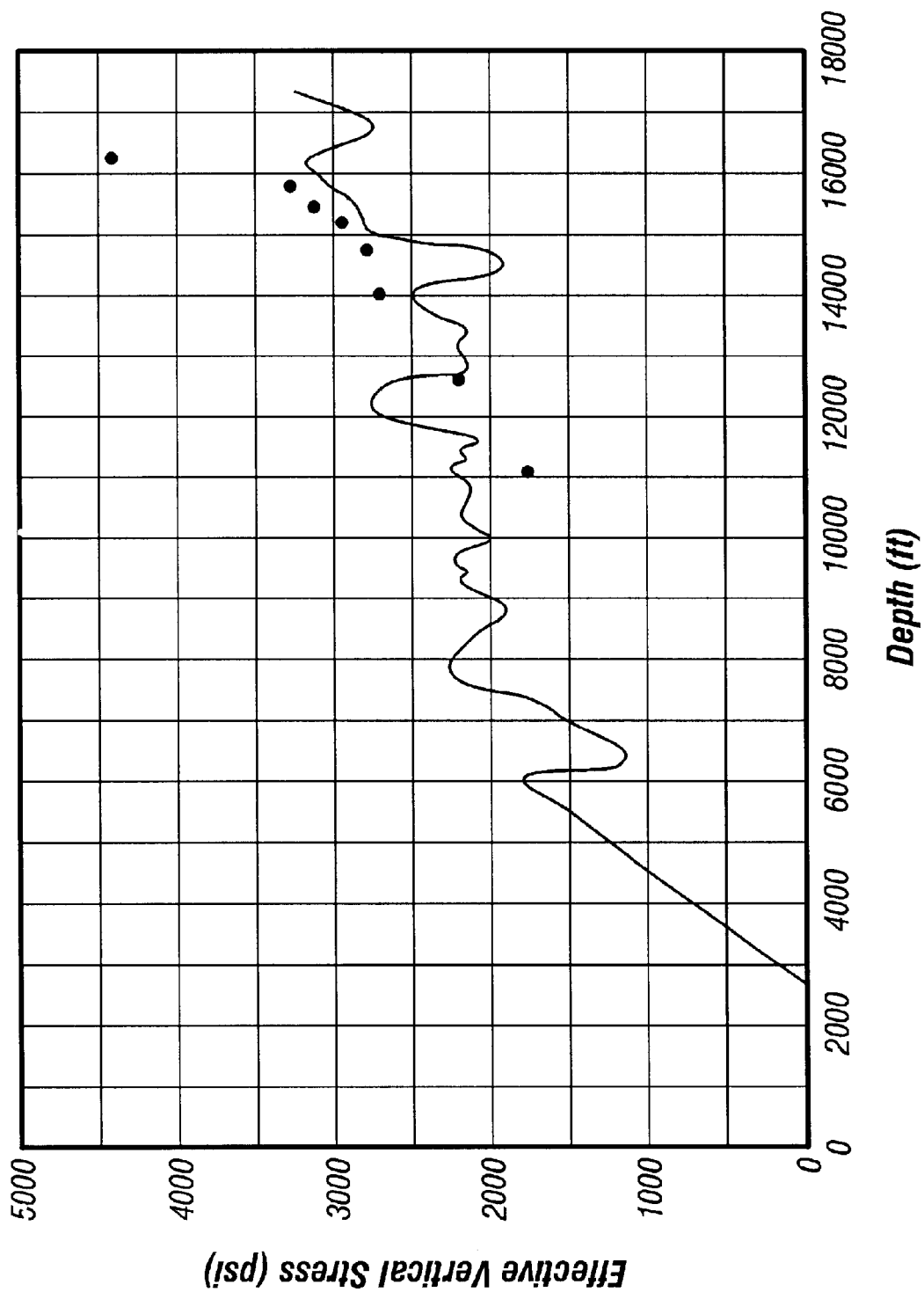
FIG. 1B depicts the results obtained by computing the effective vertical stress plotted against RFT data.

FIG. 1 shows a velocity function derived from a sonic log in approximately 2500 feet of water in the Garden Banks area of the Gulf of Mexico. FIG. 1A shows the results obtained by computing the effective vertical stress using equation (7) above plotted against the RFT (Repeat Formation Test) data An initial condition of 0.535 psi/ft was used. The results are comparable to those measured in the Repeat Formation Test. Calculations made using the method of equation (9) were made and found to be almost identical.

Figure 2A:
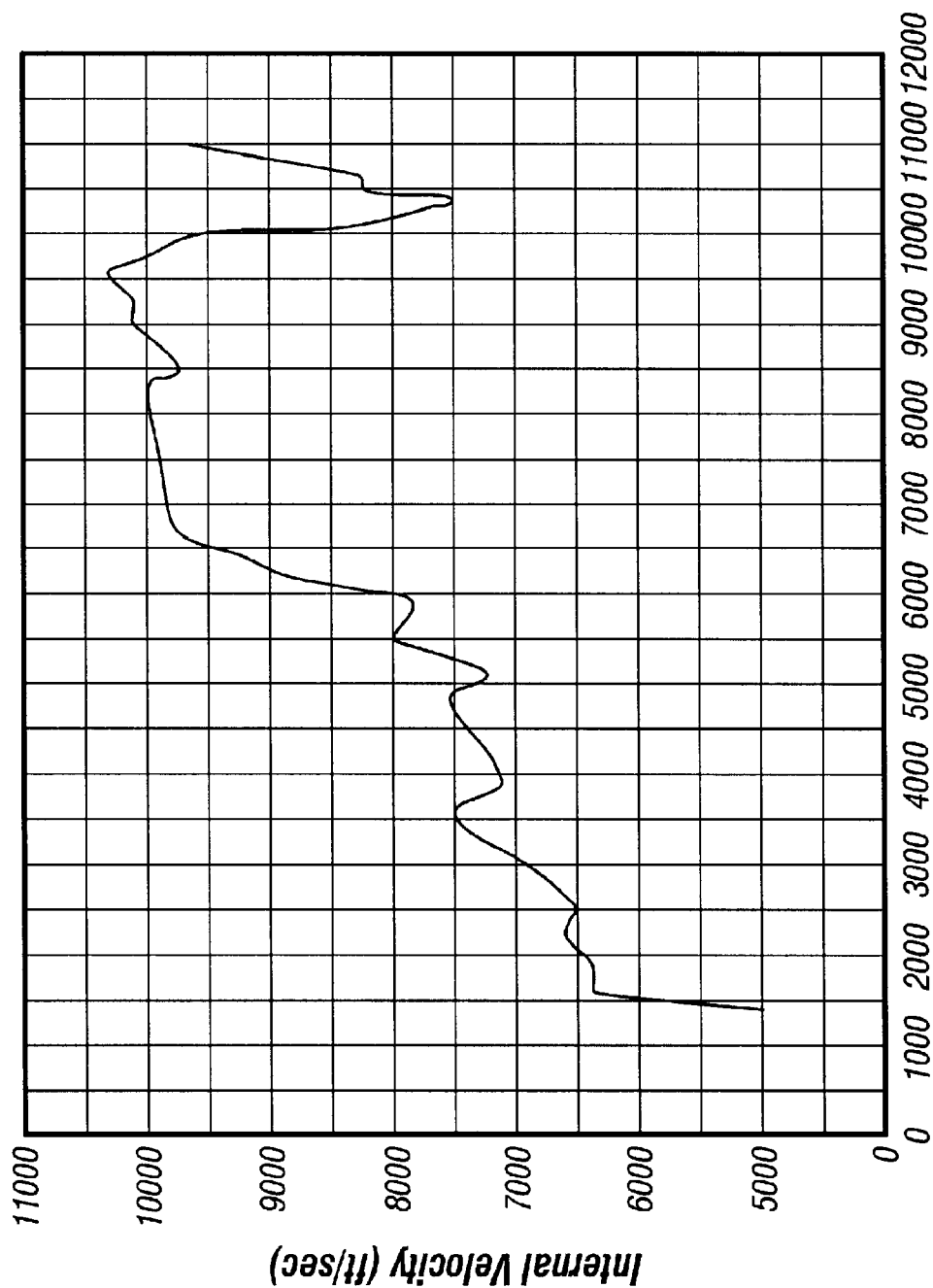
FIG. 2A depicts a velocity function in approximately 1400 feet or water in the Gulf of Mexico.
Figure 2B:
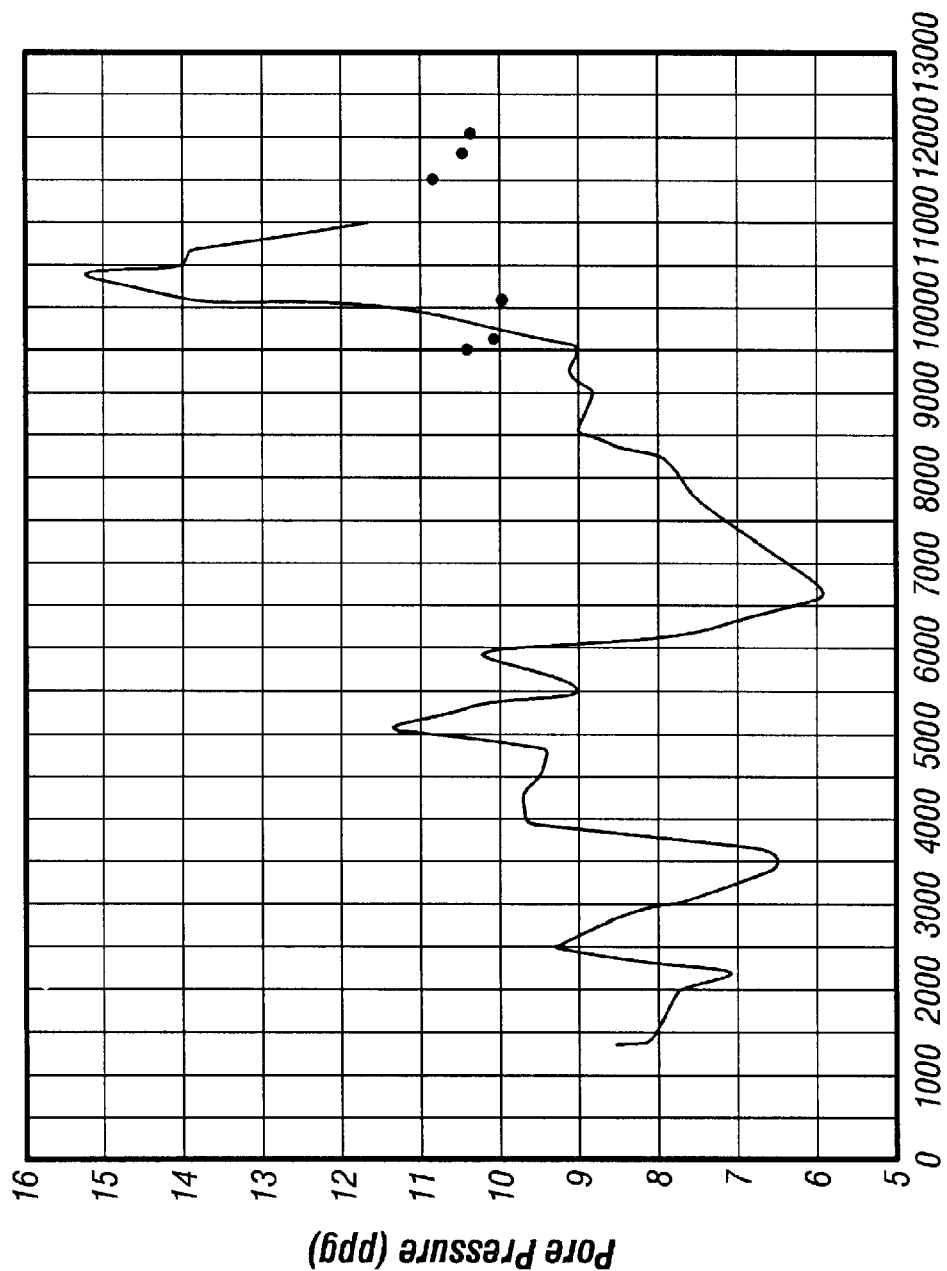
FIG. 2B depicts the results obtained by first computing the effective vertical stress, by calculating the densities and integrating to get the total overburden stresses, and finally by subtracting the effective stresses from the total overburden stresses to obtain the pore pressures at the example location.

FIG. 2 shows a velocity function in approximately 1400 feet of water in the Gulf of Mexico. FIG. 2A shows the results obtained by first computing the effective vertical stress using equation (7) above, by then calculating the densities and integrating to get the total overburden stresses, and finally by subtracting, according to Terzaghi's principal, the effective stresses from the total overburden stresses to obtain the pore pressures at the example location. The results are plotted in units of pounds/gallon (ppg) against the results of the RFT results measured in that well. The results are comparable. Calculations made using the method of equation (9) above were made and found to be almost identical. An initial condition of 0.535 psi/ft was used for f'(0).

Figure 3A:
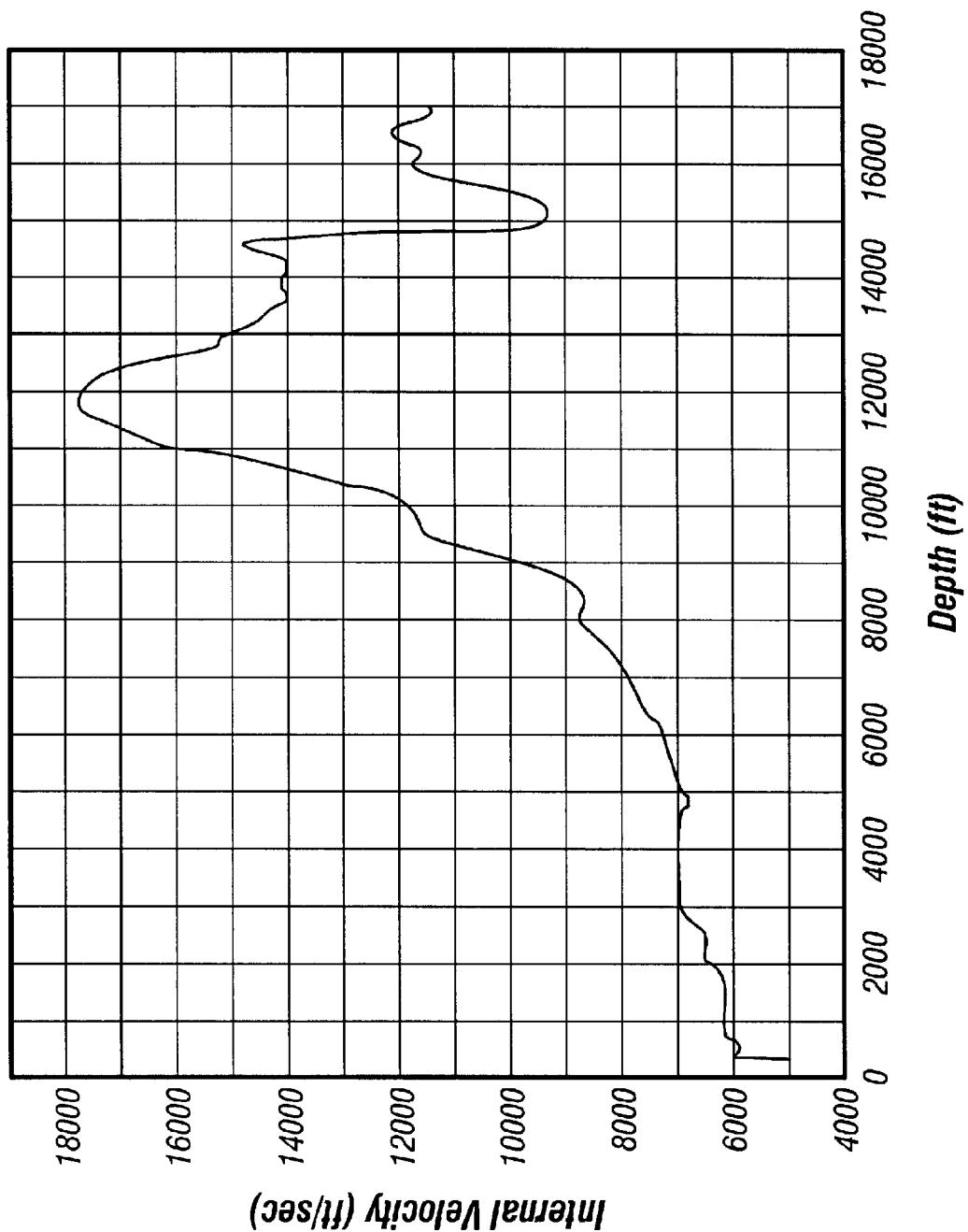
FIG. 3A depicts a velocity function from the North Sea.
Figure 3B:
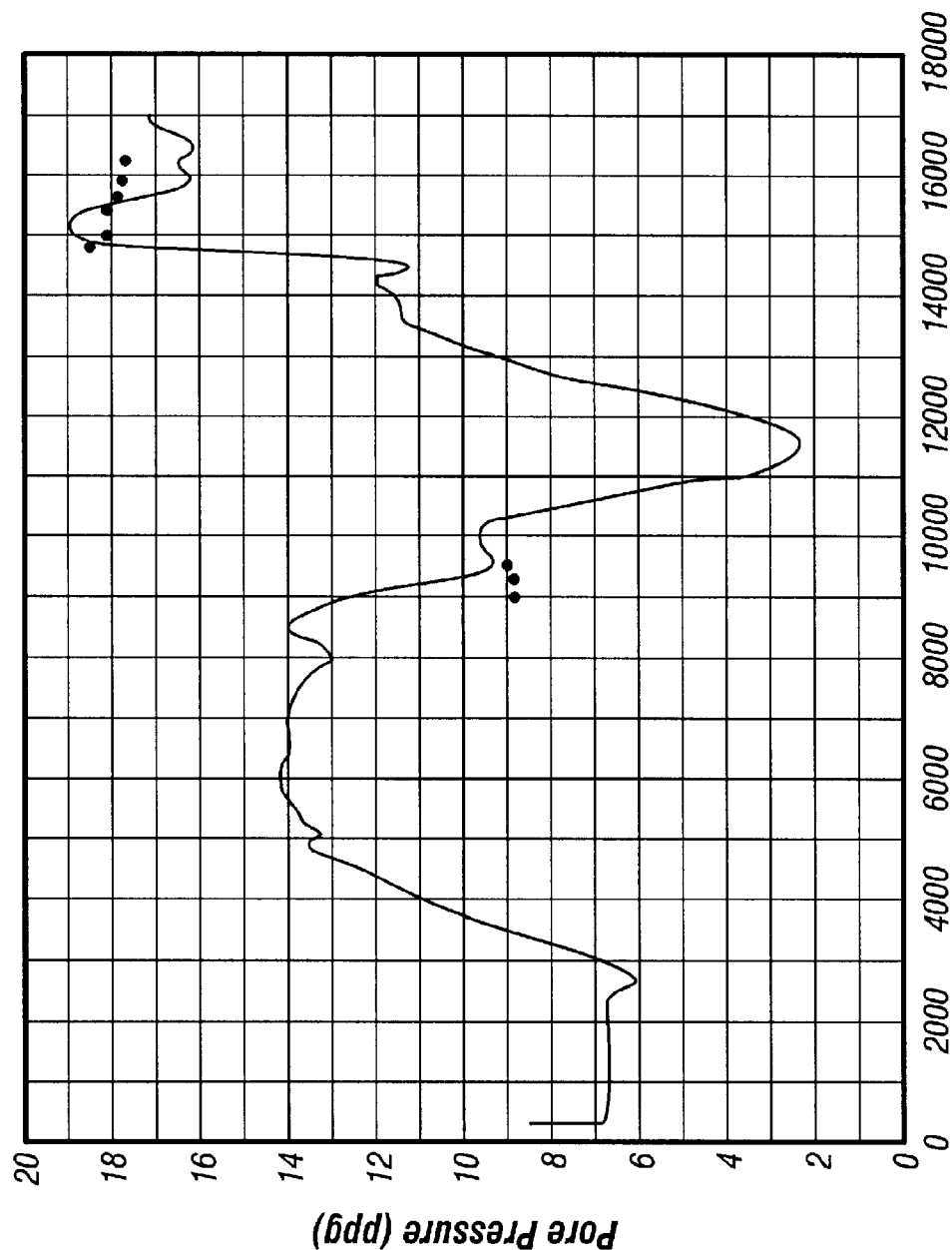
FIG. 3B depicts the results obtained by first computing the effective vertical stress, by then calculating the densities and integrating to get the total overburden stresses, and finally by subtracting the effective stresses from the total overburden stresses to obtain the pore pressures at the example location.

FIG. 3 shows a velocity function from the North Sea. FIG. 3A shows the results obtained by first computing the effective vertical stress using equation (7) above, by then calculating the densities and integrating to get the total overburden stresses, and finally by subtracting, according to Terzaghi's principal, the effective stresses from the total overburden stresses to obtain the pore pressures at the example location. The results are plotted in units of pounds/gallon (ppg) against the results of the RFT results shown in his FIG. 14B. The results are comparable. Calculations made using the method of equation (9) above were made and found to be almost identical. An initial condition of 0.535 psi/ft was used for f'(0). The water depth at this well was approximately 290'. This last example shows the robustness of the method, correctly estimating the pore pressures both above and below the chalk layer.

There is however, one case where the method is thought to be limited; that is when measurements are taken across a formation that is heavily gas laden. It is expected that the presence of gas in large quantities will cause an underestimation of the effective vertical stresses across the formation that will result in an overestimation of subsequent pore pressure in the gas zone.

It is further noted that all first and second derivatives determined in the equations shown in this invention may be calculated by any computer, mathematical, graphical or similar appropriate method as known in the art.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A method for estimating effective vertical stress in subterranean formations at specified geodetic locations, said method comprising the steps of:
   calculating second derivatives of an interval velocity versus depth function computed from data obtained by a seismic means in said subterranean formations at each of said specified geodetic locations;
   furnishing an initial condition comprising an initial rate of change in effective vertical stress versus depth from an initial datum to a predetermined depth; and
   using said second derivatives of said interval velocity versus depth function and said initial condition to calculate by numerical integration a complete effective vertical stress versus depth function in said subterranean formations beyond said predetermined depth at each of said specified geodetic locations.

2. The method as in claim 1, wherein said initial datum is at a water bottom depth in a marine application.

3. The method as in claim 1, wherein said initial datum is a terrain surface in a land application.

4. The method as in claim 1, further comprising:
   estimating an overburden stress versus depth function at each of said specified geodetic locations; and
   calculating pore pressures in said subterranean formations at each of said specified geodetic locations by subtracting said effective vertical stress versus depth function computed at each said specified geodetic location from said overburden stress versus depth function estimated at each said geodetic location.

5. A method as in claim 4, wherein said overburden stress versus depth function estimation step is determined by integrating density data, said density data being computed from said interval velocity versus depth function computed from data obtained by a seismic means at said specified geodetic locations where pore pressure estimations are made.

6. A method as in claim 4, wherein said overburden stress versus depth function estimation step is performed by using an overburden stress versus depth function determined by integrating density data obtained from at least one well geologically similar to a location at which said pore pressure estimations are made.

7. A method for estimating effective vertical stress in subterranean formations at a specified geodetic location, said method comprising the steps of:
   calculating second derivatives of an interval velocity versus depth function computed from data obtained by a sonic well log in said subterranean formations at said specified geodetic location;
   furnishing an initial condition comprising an initial rate of change in effective vertical stress versus depth from an initial datum to a predetermined depth; and
   using said second derivatives of said interval velocity versus depth function and said initial condition to calculate by numerical integration a complete effective vertical stress versus depth function in said subterranean formations beyond said predetermined depth at said specified geodetic location.

8. The method as in claim 7, wherein said initial datum is at a water bottom depth in a marine application.

9. The method as in claim 7, wherein said initial datum is a terrain surface in a land application.

10. The method as in claim 7, further comprising:
    estimating an overburden stress versus depth function at said specified geodetic location; and
    calculating pore pressures in said subterranean formations at said specified geodetic location by subtracting said effective vertical stress versus depth function computed at said specified geodetic location from said overburden stress versus depth function estimated at said geodetic location.

11. A method as in claim 10, wherein said overburden stress versus depth function estimation step is determined by integrating density data, said density data being computed from data obtained from a well density log at said specified geodetic location where pore pressure estimations are made.

12. A method for estimating effective vertical stress in subterranean formations at specified geodetic locations, said method comprising the steps of:
    calculating second derivatives of an interval velocity versus time function computed from data obtained by a seismic means in said subterranean formations at each of said specified geodetic locations;
    furnishing an initial condition comprising an initial rate of change in effective vertical stress versus time from an initial datum to a predetermined time; and
    using said second derivatives of said interval velocity versus time function and said initial condition to calculate by numerical integration a complete effective vertical stress versus time function in said subterranean formations beyond said predetermined time at each of said specified geodetic locations.

13. The method as in claim 12, further comprising converting at said specified geodetic locations said effective vertical stress versus time functions to effective vertical stress versus depth functions.

14. The method as in claim 12, wherein said initial datum is at a water bottom time in a marine application.

15. The method as in claim 12, wherein said initial datum in a land application is a terrain surface expressed in times.

16. The method as in claim 13, further comprising:
estimating an overburden stress versus depth function at each of said specified geodetic locations; and
calculating pore pressures in said subterranean formations at each of said specified geodetic locations by subtracting said effective vertical stress versus depth function computed at each said specified geodetic location from said overburden stress versus depth function estimated at each said geodetic location.

17. A method as in claim 16, wherein said overburden stress versus depth function estimation step is determined by integrating density data, said density data being computed from said interval velocity versus depth function computed from data obtained by a seismic means at said specified geodetic locations where pore pressure estimations are made.

18. A method as in claim 16, wherein said overburden stress versus depth function estimation step is performed by using an overburden stress versus depth function determined by integrating density data obtained from at least one well geologically similar to a location at which said pore pressure estimations are made.

19. A method for estimating effective vertical stress in subterranean formations at specified geodetic locations, said method comprising the steps of:
calculating first derivatives of an interval velocity versus depth function computed from data obtained by a seismic means in said subterranean formations at each of said specified geodetic locations;
furnishing a first initial condition comprising an initial rate of change in effective vertical stress versus depth from an initial datum to a predetermined depth;
furnishing a second initial condition comprising an interval velocity of rock at said initial datum;
furnishing a third initial condition comprising an initial rate of change in said interval velocity versus depth from said initial datum to a predetermined depth; and
using said first derivatives of said interval velocity versus depth function and said initial conditions to calculate by numerical integration a complete effective vertical stress versus depth function in said subterranean formations beyond said predetermined depth at each of said specified geodetic locations.

20. The method as in claim 19, wherein said initial datum is at a water bottom depth in a marine application.

21. The method as in claim 19, wherein said initial datum is a terrain surface in a land application.

22. The method as in claim 19, further comprising:
estimating an overburden stress versus depth function at each of said specified geodetic locations; and
calculating pore pressures in said subterranean formations at each of said specified geodetic locations by subtracting said effective vertical stress versus depth function computed at each said specified geodetic location from said overburden stress versus depth function estimated at each said geodetic location.

23. A method as in claim 22, wherein said overburden stress versus depth function estimation step is determined by integrating density data, said density data being computed from said interval velocity versus depth function computed from data obtained by a seismic means at said specified geodetic locations where pore pressure estimations are made.

24. A method as in claim 22, wherein said overburden stress versus depth function estimation step is performed by using an overburden stress versus depth function determined by integrating density data obtained from at least one well geologically similar to a location at which said pore pressure estimations are made.

25. A method for estimating effective vertical stress in subterranean formations at a specified geodetic location, said method comprising the steps of:
calculating first derivatives of an interval velocity versus depth function computed from data obtained by a sonic well log in said subterranean formations at said specified geodetic location;
furnishing a first initial condition comprising an initial rate of change in effective vertical stress versus depth from an initial datum to a predetermined depth;
furnishing a second initial condition comprising an interval velocity of rock at said initial datum;
furnishing a third initial condition comprising an initial rate of change in said interval velocity versus depth from said initial datum to a predetermined depth; and
using said first derivatives of said interval velocity versus depth function and said initial condition to calculate by numerical integration a complete effective vertical stress versus depth function in said subterranean formations beyond said predetermined depth at said specified geodetic location.

26. The method as in claim 25, wherein said initial datum is at a water bottom depth in a marine application.

27. The method as in claim 25, wherein said initial datum is a terrain surface in a land application.

28. The method as in claim 25, further comprising:
estimating an overburden stress versus depth function at said specified geodetic location; and
calculating pore pressures in said subterranean formations at said specified geodetic location by subtracting said effective vertical stress versus depth function computed at said specified geodetic location from said overburden stress versus depth function estimated at said geodetic location.

29. A method as in claim 28, wherein said overburden stress versus depth function estimation step is determined by integrating density data, said density data being computed from data obtained from a well density log at said specified geodetic location where pore pressure estimations are made.

30. A method for estimating effective vertical stress in subterranean formations at specified geodetic locations, said method comprising the steps of:
calculating first derivatives of an interval velocity versus time function computed from data obtained by a seismic means in said subterranean formations at each of said specified geodetic locations;
furnishing a first initial condition comprising an initial rate of change in effective vertical stress versus time from an initial datum to a predetermined time;
furnishing a second initial condition comprising an interval velocity of rock at said initial datum;
furnishing a third initial condition comprising an initial rate of change in said interval velocity versus time from said initial datum to a predetermined time; and
using said first derivatives of said interval velocity versus time function and said initial conditions to calculate by numerical integration a complete effective vertical stress versus time function in said subterranean formations beyond said predetermined time at each of said specified geodetic locations.

31. The method as in claim 30, further comprising converting at said specified geodetic locations said effective vertical stress versus time functions to effective vertical stress versus depth functions.

32. The method as in claim 30, wherein said initial datum is at a water bottom time in a marine application.

33. The method as in claim 30, wherein said initial datum in a land application is a terrain surface expressed in time.

34. The method as in claim 31, further comprising:
estimating an overburden stress versus depth function at each of said specified geodetic locations; and
calculating pore pressures in said subterranean formations at each of said specified geodetic locations by subtracting said effective vertical stress versus depth function computed at each said specified geodetic location from said overburden stress versus depth function estimated at each said geodetic location.

35. A method as in claim 34, wherein said overburden stress versus depth function estimation step is determined by integrating density data, said density data being computed from said interval velocity versus depth function computed from data obtained by a seismic means at said specified geodetic locations where pore pressure estimations are made.

36. A method as in claim 34, wherein said overburden stress versus depth function estimation step is performed by using an overburden stress versus depth function determined by integrating density data obtained from at least one well geologically similar to a location at which said pore pressure estimations are made.

\* \* \* \* \*